(12) United States Patent
Radosevic

(10) Patent No.: US 8,701,697 B2
(45) Date of Patent: Apr. 22, 2014

(54) PNEUMATIC SYSTEM

(75) Inventor: Michael J. Radosevic, Wauwatosa, WI (US)

(73) Assignee: Techmaster Inc., Menomonee Falls, WI (US)

(*) Notice: Subject to any disclaimer, the term of this patent is extended or adjusted under 35 U.S.C. 154(b) by 350 days.

(21) Appl. No.: 12/795,390

(22) Filed: Jun. 7, 2010

(65) Prior Publication Data

US 2011/0297246 A1   Dec. 8, 2011

(51) Int. Cl.
   *F16K 31/36* (2006.01)
(52) U.S. Cl.
   USPC ...... 137/224; 137/227; 137/228; 137/505.13; 141/197
(58) Field of Classification Search
   USPC .......... 137/227, 228, 505.13, 505.14, 505.15, 137/505.21, 85, 224; 73/1.57, 1.71, 1.72; 141/197
   See application file for complete search history.

(56) References Cited

U.S. PATENT DOCUMENTS

| | | | |
|---|---|---|---|
| 3,104,675 A * | 9/1963 | Blenman | 137/225 |
| 3,555,970 A | 1/1971 | Borgeson et al. | |
| 3,583,422 A * | 6/1971 | Dach et al. | 137/116.3 |
| 3,628,556 A | 12/1971 | Bachman | |
| 3,732,887 A | 5/1973 | Hayner | |
| 4,066,006 A | 1/1978 | Heiser | |
| 4,153,075 A | 5/1979 | Budzich | |
| 4,264,014 A * | 4/1981 | Hogg et al. | 212/276 |
| 4,362,089 A | 12/1982 | Melocik et al. | |
| 4,372,193 A | 2/1983 | Hall | |
| 4,509,406 A | 4/1985 | Melocik | |
| 4,598,626 A | 7/1986 | Walters et al. | |
| 4,714,098 A * | 12/1987 | Stuckel | 141/85 |
| 4,883,091 A | 11/1989 | Weiler et al. | |
| 5,056,561 A | 10/1991 | Byers | |
| 5,184,535 A | 2/1993 | Kimura | |
| 5,454,407 A * | 10/1995 | Huza et al. | 141/10 |
| 6,170,507 B1 * | 1/2001 | Dalton et al. | 137/12 |
| 6,457,921 B1 | 10/2002 | Freeman | |
| 6,705,342 B2 * | 3/2004 | Santinanavat et al. | 137/489 |
| 6,746,190 B2 | 6/2004 | Freeman | |
| 7,770,612 B1 * | 8/2010 | Brown | 141/193 |

OTHER PUBLICATIONS

Numatics® Mark 3 Series Product Catalog, 1995, 16 pages.

* cited by examiner

*Primary Examiner* — William McCalister
(74) *Attorney, Agent, or Firm* — Foley & Lardner LLP

(57) ABSTRACT

A pneumatic system includes a first line, a second line, and a valve. The first line is configured to be connected to a container, and to convey a flow of gas from a source to the container. The second line is arranged co-axially with the first line and is in communication with gas in the container. The valve is connected in series with the first line, between the source and the container. Furthermore, the valve is in communication with the second line and is configured to control the flow of gas through the first line as a function of a characteristic of the gas in the container, as communicated by the second line.

15 Claims, 7 Drawing Sheets

PNEUMATIC SYSTEM

BACKGROUND

The present disclosure relates generally to a pneumatic system and associated valves used to control a flow of gas from a higher-pressure source supplied to a lower-pressure container.

One type of pressurized container of gas is a dunnage bag. Dunnage bags are used to secure cargo of tractor trailers, railroad cars, and other vehicles. The dunnage bags are inflated on the sides of the cargo, such as between the cargo and walls of the respective vehicle. Once inflated, the dunnage bags provide a secure fit for the cargo in the vehicle, preventing unintended and undesired movement of the cargo during transportation thereof.

Typically the dunnage bags are formed from paper and interiorly lined with plastic. Other dunnage bags may be formed entirely from plastic. Paper and plastic materials allow for inexpensive manufacturing and replacement of dunnage bags, however the materials are not generally designed to withstand pressures above around 10 to 15 pounds per square inch (psi). During use, the dunnage bags are ideally inflated to pressures of about 2 psi, substantially below the pressures at which the dunnage bags would fail.

A typical tractor trailer may use twenty or more dunnage bags at a time, such as using ten or more on each side of the interior of the trailer. A trucker or loader using the dunnage bags must manually position and inflate each dunnage bag to secure the cargo. Once positioned between the cargo and a wall of the vehicle, the dunnage bags are typically inflated by a pressure-regulated pneumatic supply. The supply pressure is regulated to a safe pressure for the dunnage bags, typically around 2 psi. Inflating the dunnage bags by a regulated source providing air at 2 psi typically corresponds to a relatively low air flow rate for inflation of the bags. Accordingly, the task of securing the cargo by positioning and inflating each dunnage bag can be quite time consuming.

SUMMARY

One embodiment of the invention relates a pneumatic system, which includes a first line, a second line, and a valve. The first line is configured to be connected to a container, and to convey a flow of gas from a source to the container. The second line is arranged co-axially with the first line and is in communication with gas in the container. The valve is connected in series with the first line, between the source and the container. Furthermore, the valve is in communication with the second line and is configured to control the flow of gas through the first line as a function of a characteristic of the gas in the container, as communicated by the second line.

Another embodiment of the invention relates to a pneumatic system, which includes a first line, a second line, and a valve. The first line is configured to be connected to a container, and to convey a flow of gas from a source to the container. The second line configured such that when the first line is connected to the container, the second line is simultaneously placed in communication with gas in the container. The valve is connected in series with the first line, between the source and the container. The valve is also in communication with the second line and is configured to control the flow of gas through the first line as a function of a characteristic of the gas in the container, as communicated by the second line.

Yet another embodiment of the invention relates to a pneumatic system, which includes a first line, a second line, and a valve. The first line is configured to be connected to a lower-pressure container, and to convey a flow of gas from a higher-pressure source to the lower-pressure container. The second line is connected to the first line and is in communication with gas in the lower-pressure container. Furthermore, the second line projects from an end of the first line such that when the first line is connected to the lower-pressure container, the second line extends into the volume of the lower-pressure container. The valve is connected in series with the first line, between the higher-pressure source and the lower-pressure container. The valve is also in communication with the second line, and is configured to control the flow of gas through the first line as a function of a characteristic of the gas in the lower-pressure container, as communicated by the second line.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
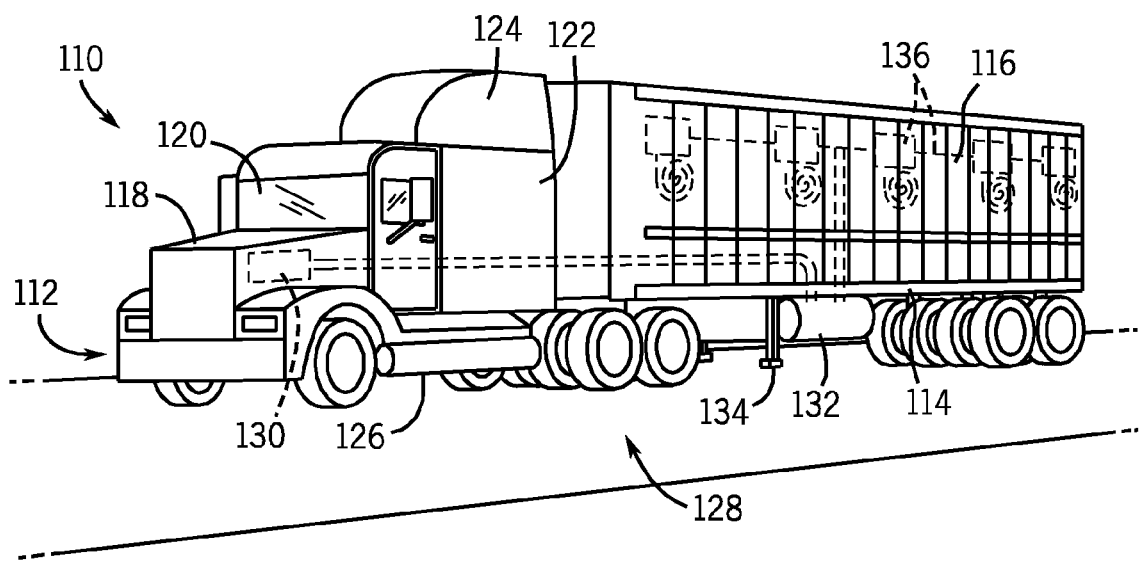
FIG. 1 is a perspective view of a tractor trailer according to an exemplary embodiment of the invention.

Referring to FIG. 1, a tractor trailer 110 includes a tractor 112 and a trailer 114 having a container 116 coupled thereto. The tractor 112 includes an engine compartment 118, a cabin 120, a sleeper 122, an air dam 124, and fuel tanks 126, among other components and features. The trailer 114 is coupled to the tractor 112, such as at a fifth wheel coupling 128. The container 116 of the trailer 114 includes cargo space therein (see FIG. 2), and may include landing gear 134 for use to support the container 116 when the trailer 114 is detached from the tractor 112.

According to an exemplary embodiment, the tractor trailer 110 includes one or more air compressors 130. One air compressor 130 may be located in the engine compartment 118. Another air compressor (not shown) may be located below the trailer 114. Yet another air compressor (not shown) may be located in or below the tractor 112. Sill other air compressors or different sources of pressurized gas may be provided in other locations on the tractor trailer 110. In some embodiments one or more air compressors are coupled to a receiver tank 132 (e.g., pressure vessel), which may in turn be coupled to air brakes, suspension components, tires, or to other portions of the tractor trailer 110 for operations thereof.

Figure 2:
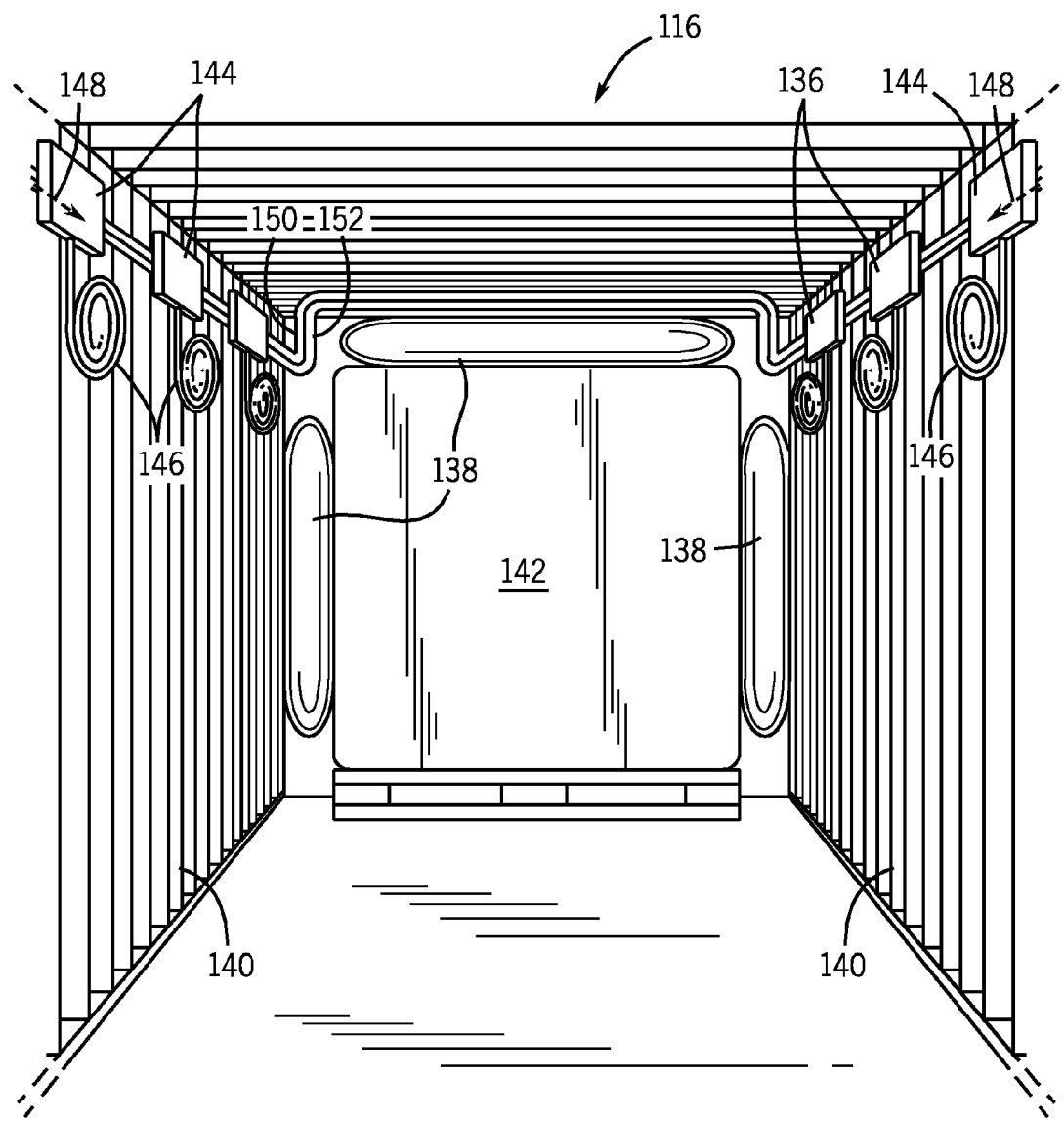
FIG. 2 is a perspective view of an interior of a container for a tractor trailer according to an exemplary embodiment of the invention.

Referring to FIG. 2, the tractor trailer 110 further includes a pneumatic system 136 (see also FIG. 1) for inflation of dunnage bags 138 used in the container 116 of the trailer 114 to secure cargo therein. In some embodiments, the pneumatic system 136 is mounted to an interior wall 140 of the container 116, preferably above the load line, such that the valve system is accessible with cargo 142 present in the container 116.

In some embodiments, the pneumatic system 136 is connected to the receiver tank 132 and/or to other pressure vessels (e.g., one or more pressurized-gas cylinders). In other embodiments, the pneumatic system 136 is connected directly to one or more of the air compressors associated with the tractor trailer (e.g., tire inflation system). In still other embodiments, the pneumatic system 136 is connected to an auxiliary air compressor that is not associated with other functions or features of the tractor trailer 110, such as a commercially-available portable air compressor.

According to an exemplary embodiment, the pneumatic system 136 includes one or more stations 144 (e.g., drops) from which a fill line 146 (e.g., hose, tube, port) may be used to inflate one or more of the dunnage bags 138. According to an exemplary embodiment, the pneumatic system 136 includes two rows 148 of stations 144, with thirteen stations 144 in each row 148. One of the rows 148 is positioned along one side wall 140 of the interior of the container 116 and the other row 148 is positioned along the opposite side wall 140.

Figure 5:
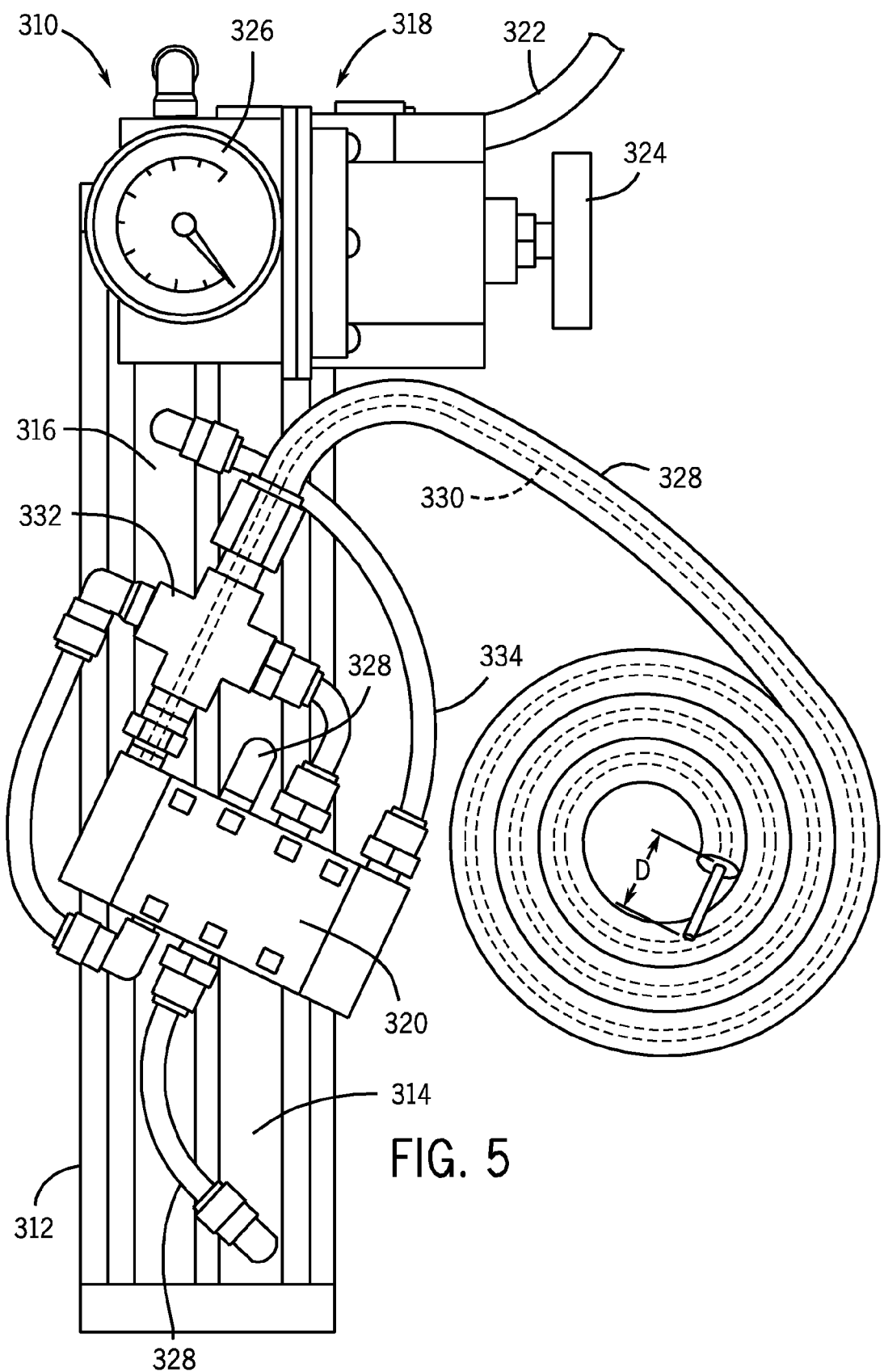
FIG. 5 is a top view of a pneumatic system according to another exemplary embodiment of the invention.

In some embodiments, the stations 144 and the two rows 148 are coupled together via a higher-pressure manifold 150 (e.g., 60 to 150 psi) that is in communication with a pressurized source of air or other gas, such as one or more of the air compressors 130 or the receiver tank 132. In such embodiments, the stations 144 and the two rows 148 are also coupled together via a lower-pressure manifold 152 (e.g., less than about 2 psi) that is in communication with a pressure-regulated source of air or other gas (see, e.g., regulator 318 as shown in FIG. 5). The higher-pressure manifold 150 and the lower-pressure manifold 152 may be coupled together in a rigid structure mounted to the walls 140 of the container 116, such as an extruded metal (e.g., aluminum) or injection-molded plastic strip having the manifolds 150, 152 in parallel conduits formed therein (see, e.g., structure 312 as shown in FIG. 5).

Figure 3:
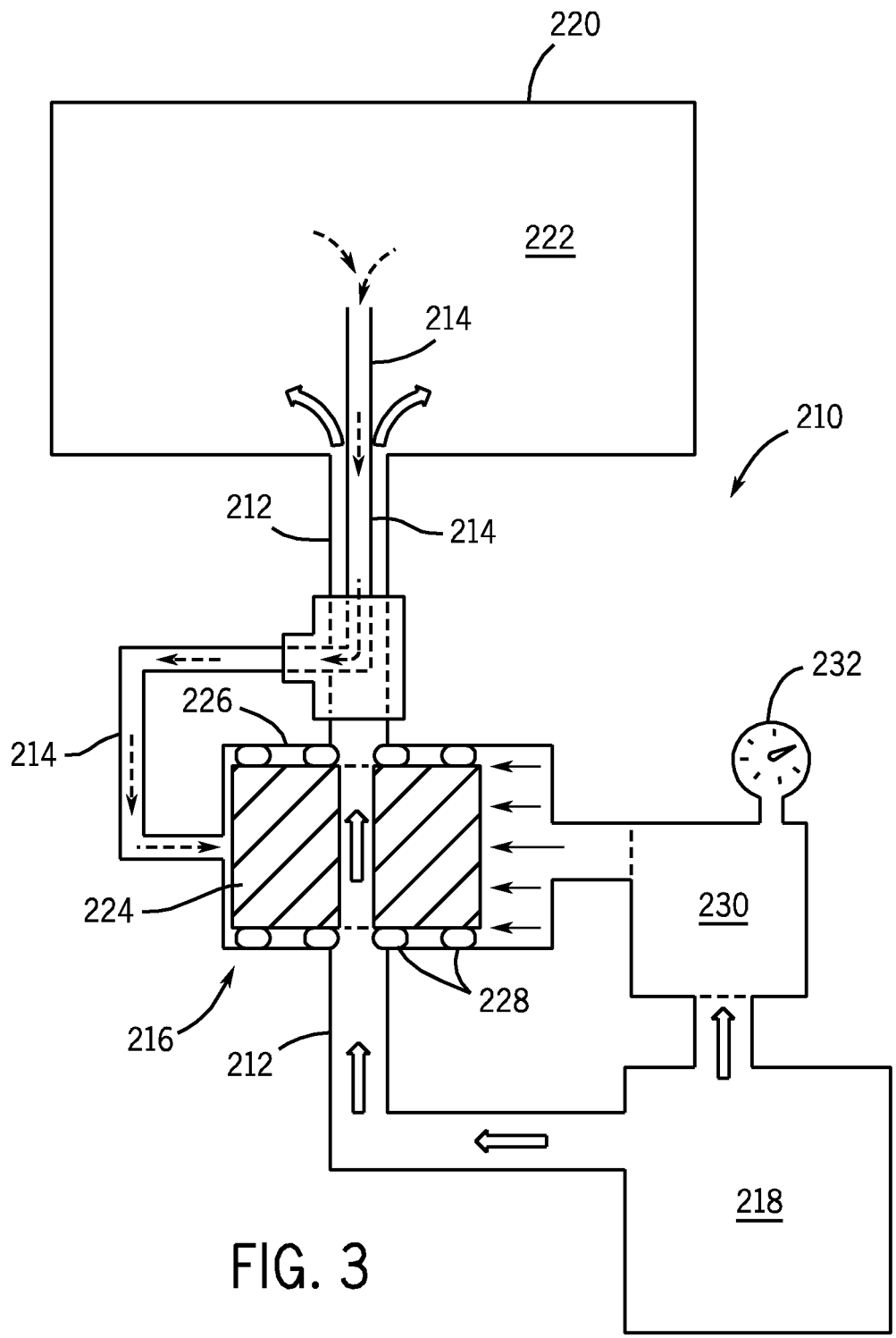
FIG. 3 is a schematic diagram of a pneumatic system in a first configuration according to an exemplary embodiment of the invention.

During use of the pneumatic system 136, the fill line 146 of a station 144 is connected to an inlet (e.g., opening, aperture, fill port) of one of the dunnage bags 138, shown as the inlet of the lower-pressure container 220 in FIG. 3. A flow-control element (e.g., valve, pneumatic switch, gate), shown as valve 216 in FIG. 3, in the station 144 selectively allows gas to inflate the dunnage bag 138 from the higher-pressure manifold 150. The pneumatic system 136 then controls the rapid inflation of the dunnage bag 138 by automatically halting the flow of gas from the higher-pressure manifold 150 when pressure in the dunnage bag 138 achieves a desired state, such as reaching or exceeding a predetermined threshold pressure corresponding to a safe-inflation pressure (e.g., 1.5 to 2.5 psi) for the dunnage bag 138. Inflating the dunnage bags 138 with gas from the higher-pressure manifold 150 increases the speed at which the dunnage bags 138 are inflated, relative to inflation from a source supplying gas at or proximate to the desired safe-inflation pressure. Following inflation, the fill line 146 may be decoupled from the dunnage bag 138 and stored or stowed in the container 116 of the trailer 114 or elsewhere.

Although shown, according to an exemplary embodiment, with the tractor-trailer 110 for use with inflation of the dunnage bags 138, the present disclosure may be applied to a broad range of pneumatic control applications and inflation tasks, and may be used with various inflatable items. In some embodiments, a pneumatic system 136 may be used to control rapid inflation of inflatable shelters, rafts, air mattresses, dirigibles, etc. In some embodiments, gases other than air may be controlled. In one such contemplated embodiment, a pneumatic system is used to quickly and safely inflate helium balloons.

Figure 4:
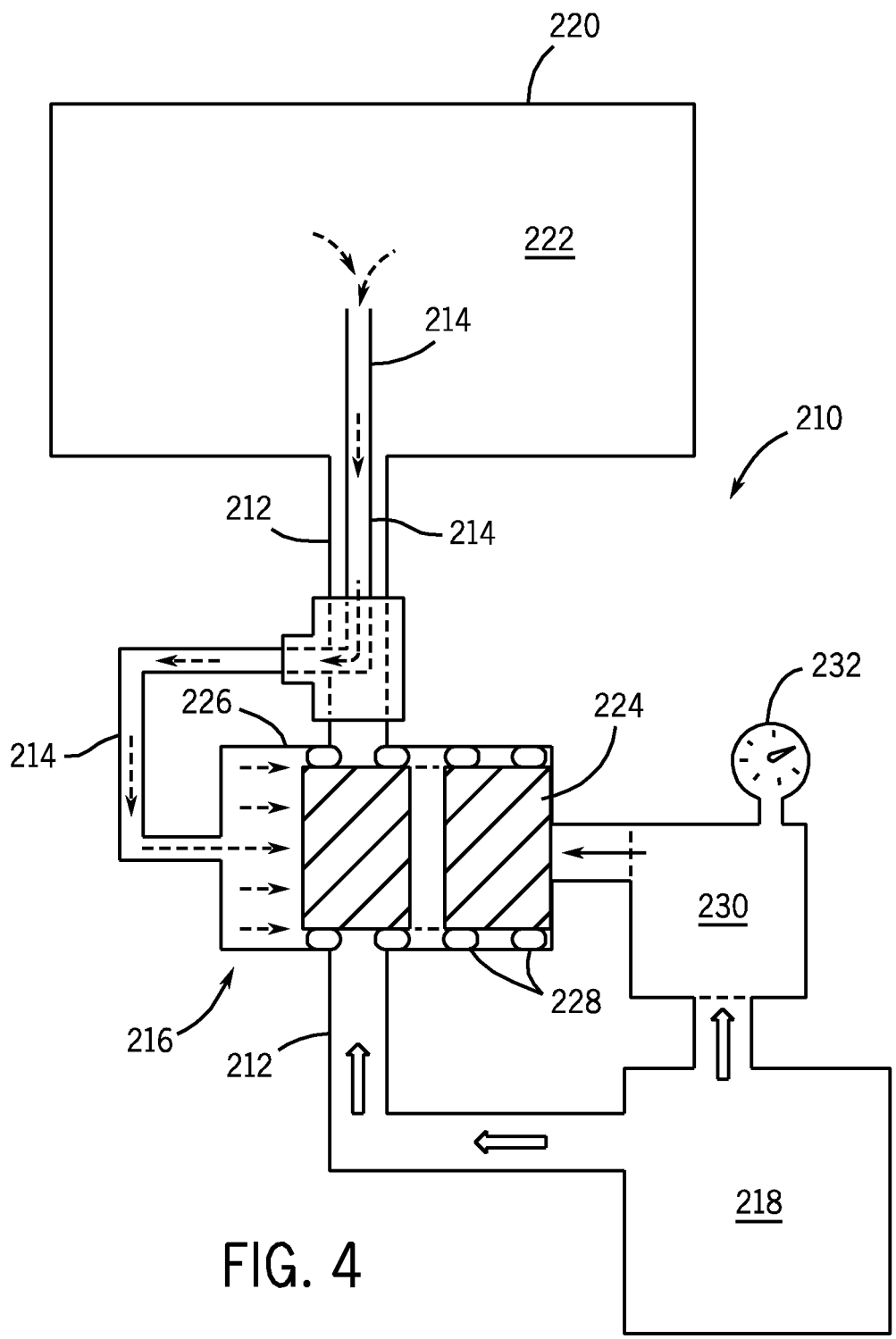
FIG. 4 is a schematic diagram of the pneumatic system of FIG. 3 in a second configuration.

Referring now to FIGS. 3-4 a pneumatic system 210 includes a supply line 212 (e.g., first line, fill line, high-pressure conduit), a feedback line 214 (e.g., second line, low-pressure conduit), and a valve 216. The supply line 212 extends between a higher-pressure source 218 and a lower-pressure container 220, and is designed to convey gas from the higher-pressure source 218 to the lower-pressure container 220. The feedback line 214 is designed to be inserted into the volume 222 of the lower-pressure container 220, to be in communication with gas in the lower-pressure container 220. The valve 216 is designed to selectively interrupt (e.g., block, close, limit) the supply line 212 as a function of a characteristic of or parameter associated with the gas in the lower-pressure container 220, where the characteristic of or parameter associated with the gas in the lower-pressure container 220 is provided to the valve 216 via communication with the feedback line 214.

According to an exemplary embodiment, the valve is operated as a function of the pressure of the gas in the lower-pressure container 220. The feedback line 214 communicates the pressure of the gas in the lower-pressure container 220 to the valve 216. In some embodiments, the feedback line 214 is a feedback tube that is pressurized in accordance with the pressure of the gas in the lower-pressure container 220, and relays that pressure to the valve 216. In other embodiments, the feedback line is an electric wire that communicates a signal indicative of the pressure in the lower-pressure container to a mechanism (e.g., solenoid) associated with the valve. In still other embodiments, the feedback line includes a network of mechanical linkages that move as a function of the pressure of the gas in the lower-pressure container, and communicate the movement to the valve for operation thereof.

According to an exemplary embodiment, the valve 216 is a spool valve, a sleeve valve, a shuttle valve, or another form of valve designed to operate by sliding a valve gate 224 to selectively interrupt the supply line 212. In some embodiments, the valve 216 is more specifically a spool and sleeve valve, where the spool and sleeve are lapped together and operate within a valve housing 226 on a bearing 228, such as a low-friction air bearing. According to such an embodiment, the valve gate 224 is operated in response to relative pressures, one supplied by the feedback line 214 and another supplied by a pressure regulator 230. In other embodiments, mechanical bearings (e.g., ball bearings, roller bearings), other types of commercially-available bearings, or no bearings are used. In still other embodiments, the valve uses a diaphragm between the two pressures to operate the valve gate.

According to an exemplary embodiment, the pneumatic system 210 includes the pressure regulator 230, which is coupled to the high-pressure source 218 or to another source of pressurized gas. In some embodiments, the pressure regulator 230 may be manually operated and is configured to control the pressure of the output thereof. In some such embodiments, the pressure regulator 230 may be configured to supply an output pressure of 0 to 2 psi. A display 232 may be coupled to the pressure regulator 230 to indicate the pressure of the output or other information related to the flow of gas.

The pressure regulator 230 is used to supply a pilot pressure to the valve 216. In some embodiments, the pilot pressure is applied to one side of the valve gate 224 and the pressure of the gas in the lower-pressure container 220 is supplied to the opposite side of the valve gate 224 by way of the feedback line 214. Accordingly, when the pilot pressure supplied by the pressure regulator 230 is greater than the pressure of the lower-pressure container 220, the valve 216 is biased to the open position (see FIG. 3). When the pilot pressure supplied by the pressure regulator 230 is less than the pressure in the lower-pressure container 220, the valve 216 closes the supply line 212, halting the flow of gas into the lower-pressure container 220 (see FIG. 4).

In other embodiments, a spring member may be used to bias the valve gate, in place of or in conjunction with the pilot pressure supplied by the pressure regulator 230. However, use of pilot pressure alone may be preferred, because adjustment of the pressure regulator may serve to adjust the pilot pressure simultaneously supplied to more than one valve, if the pressure regulator is coupled to a lower-pressure manifold (see, e.g., lower-pressure manifold 316 as shown in FIG. 5) from which more than one pneumatic valve station is connected (see, e.g., row 148 as shown in FIG. 2).

Figure 8:
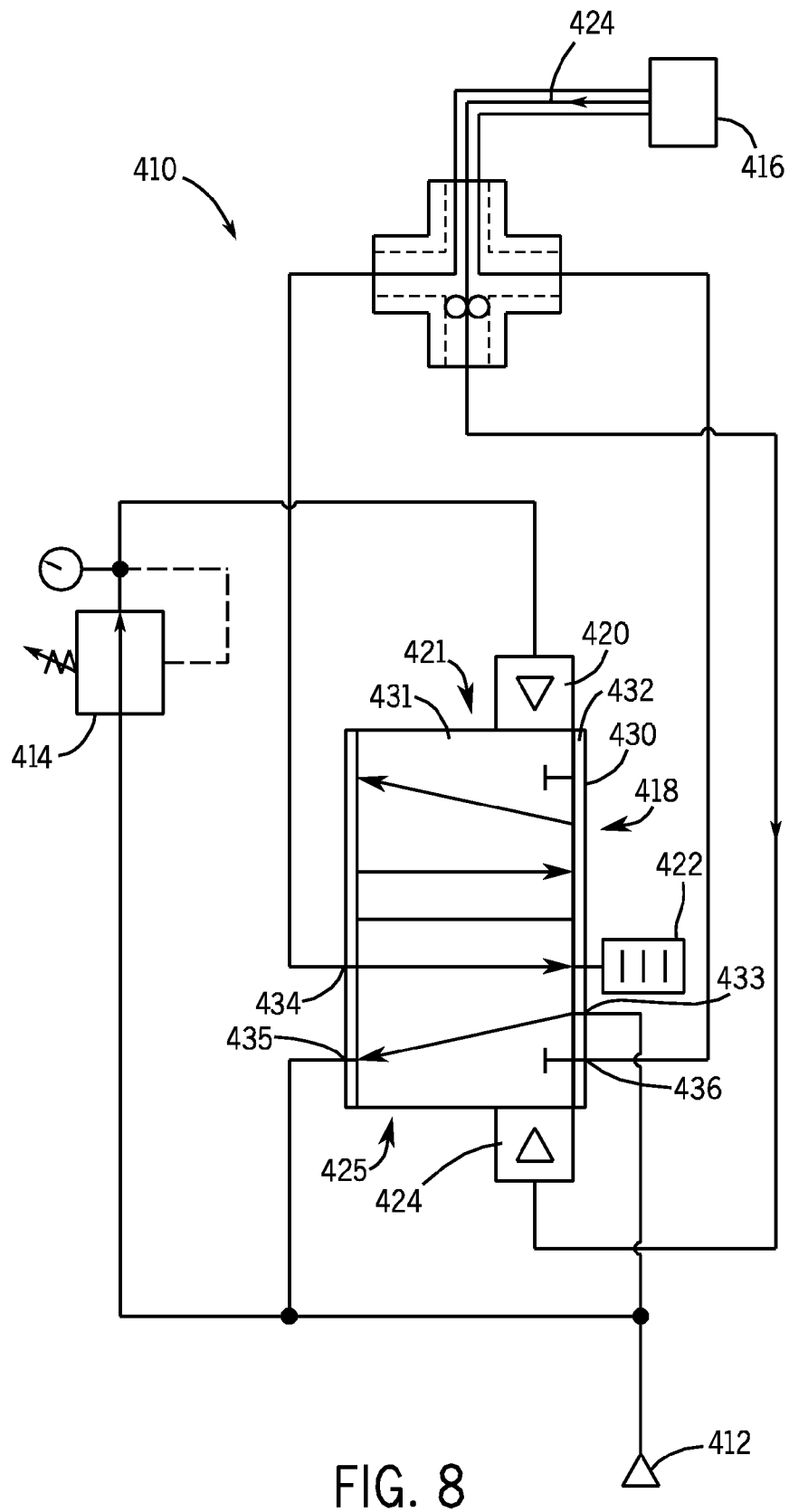
FIG. 8 is a circuit diagram of a pneumatic system according to yet another exemplary embodiment of the invention.

While FIGS. 3-4 show a simple spool valve having a closed cross-over position, in other embodiments the valve may be a pressure-relieving valve, a pressure-reducing valve, a modulating valve, a regulating valve, and/or a throttling valve (see, e.g., valve 418 of pneumatic system 410 as shown in FIG. 8). In some such embodiments, the valve is configured to both halt flow from the high-pressure source 218 and relieve pressure from the lower-pressure container 220 (see, e.g., exhaust port 422 as shown in FIG. 8).

In one contemplated application of such an embodiment including a pressure-relieving valve, the lower-pressure container 220 may receive an increasing pressure above a desired pressure even when the pressure-relieving valve is blocking the higher-pressure source, such as when the lower-pressure container 220 is transported to a higher elevation having a lower atmospheric pressure. In this contemplated application, the pressure-relieving valve would then relieve the pressure in the lower-pressure container 220, such as by venting excess gas. If the lower-pressure container 220 is then returned to a lower elevation, decreasing the pressure therein, the valve would then temporarily reopen the path between the higher-pressure source 218 and the lower-pressure container 220, as necessary, to return the lower-pressure container 220 to the desired pressure.

Figure 6:
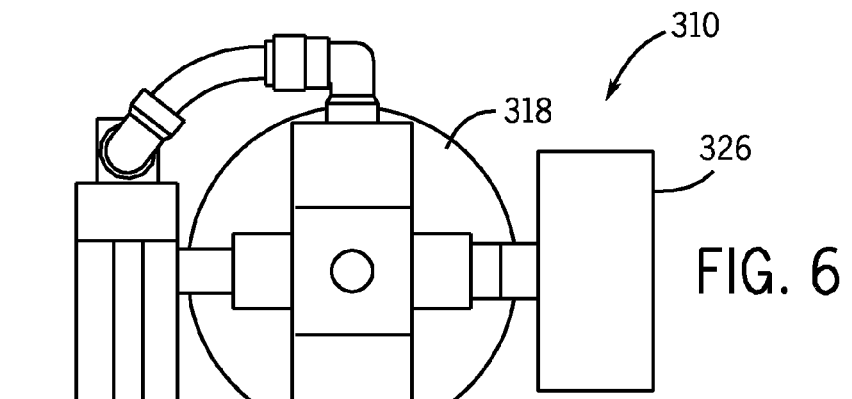
FIG. 6 is a side view of the pneumatic system of FIG. 5.
Figure 7:
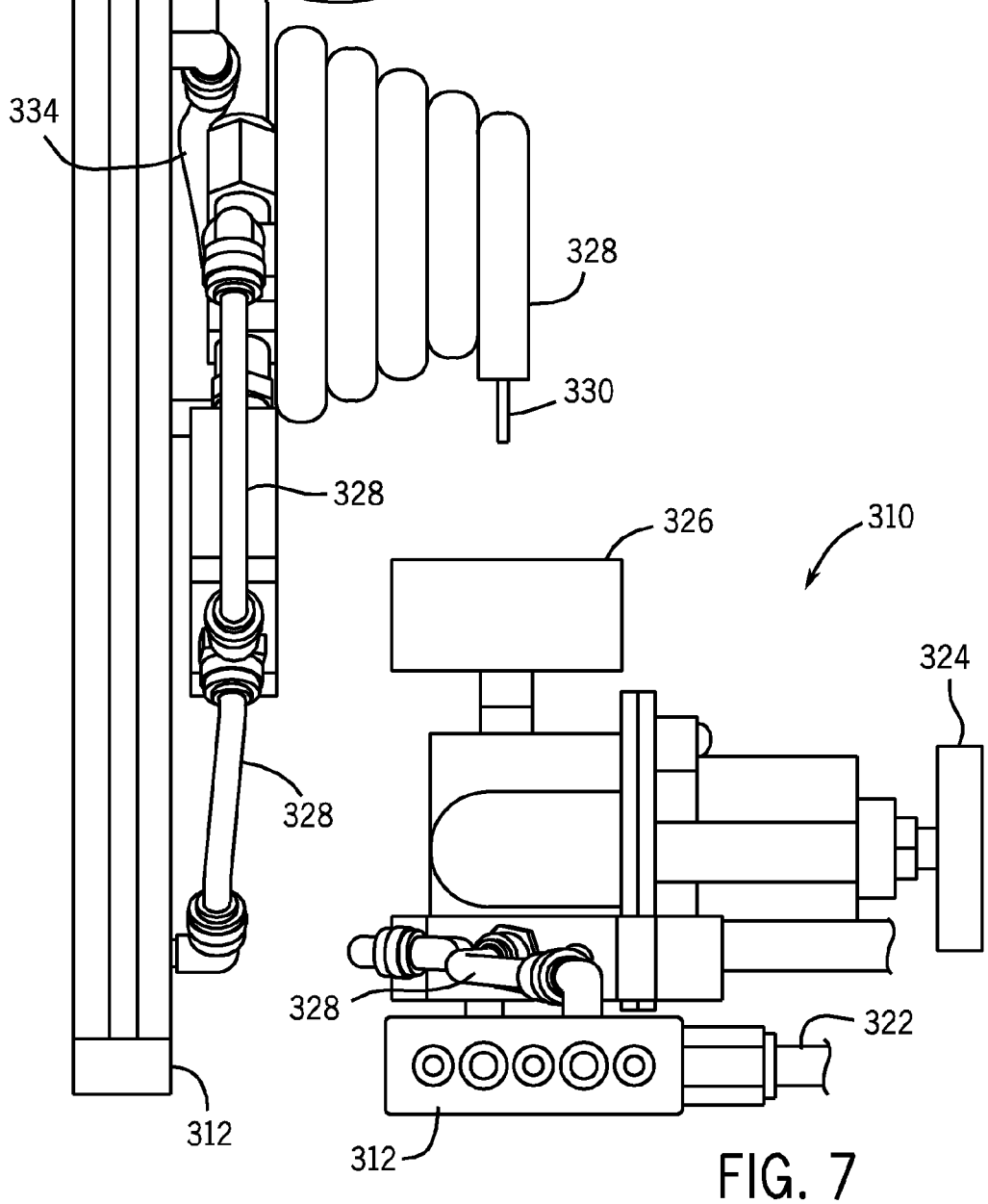
FIG. 7 is an end view of the pneumatic system of FIG. 5.

Referring now to FIGS. 5-7, a pneumatic system 310 includes a support structure 312 for a higher-pressure manifold 314 and a lower-pressure manifold 316, a pressure regulator 318, a valve 320, and associated plumbing. A conduit 322 receives pressurized gas from a source, such as a compressor (see, e.g., compressor 130 as shown in FIG. 1), and provides the gas to the higher-pressure manifold 314 and to the pressure regulator 318. The pressure regulator 318 drops the pressure of the gas passing therethrough, and provides as output the lower-pressure gas to the lower-pressure manifold 316, which serves as a pilot pressure for the valve 320. According to an exemplary embodiment, the pressure regulator 318 includes a manually-operable control interface, shown as handle 324, that allows for changing of the regulated pressure setting. The pressure regulator 318 further includes a display 326, which identifies the output pressure (e.g., gauge pressure, pilot pressure).

According to an exemplary embodiment, a supply line 328 extends from the higher-pressure manifold 314 to the valve 320 and continues from the valve 320 to a container (e.g., inflatable; see, e.g., dunnage bag 138 as shown in FIG. 2). A feedback line 330 extends co-axially through the supply line 328 and projects into the container. The feedback line 330 projects from the end of supply line 328 into the container by a distance D (e.g., at least one inch) that allows the feedback line 330 to be sensitive to the pressure of gas in the container, without substantial influence from the pressurized gas supplied by the supply line 328. In some contemplated embodiments, the feedback line includes a hooking curvature extending away from the end of the supply line to further remove the inlet of the feedback line from the path of pressurized gas exiting the supply line.

According to an exemplary embodiment, the valve 320 is a directional control valve, such as a 5-port, 4-way directional control valve. In some such embodiments, the valve 320 has a lapped spool and sleeve valve gate that is slidable over an air bearing. Two conduits of the supply line 328 extend from the higher-pressure manifold 314 to supply pressurized gas to the valve 320. A second two conduits of the supply line 328 extend from the valve 320 to supply the pressurized gas to a cross-shaped juncture 332, when the valve 320 is open. Doubling of the conduits of the supply line 328 to and from the valve 320 doubles the capacity of the valve 320. The conduits of the supply line 328 are joined in the juncture 332, where the higher-pressure gas is conveyed through a single conduit of the supply line 328 to the container.

According to an exemplary embodiment, the feedback line 330 extends from the container through the supply line 328 and into the juncture 332, such as extending co-axially with the supply line 328 such that one line is inside the other (i.e., as opposed to the center axes of the lines being strictly aligned). According to a preferred embodiment, the feedback line 330 is narrower than the supply line 328, and extends co-axially therein. The feedback line 330 is further coupled to the valve 320 such that the pressure of the gas in the container, which is communicated via the feedback line 330, is delivered to the valve 320. Opposite to the connection with the feedback line 330, another conduit 334 extends from the lower-pressure manifold 316 to the valve 320 and supplies the pilot pressure thereto.

According to an exemplary embodiment, the valve 320 is operated as a function of the relative pressure of the gas in the container communicated via the feedback line 330 and the pilot pressure communicated via the conduit 334 coupled to the lower-pressure manifold 316. When the pilot pressure from the pressure regulator 318 exceeds the pressure of the container as communicated by the feedback line 330, the valve 320 is open. When the pilot pressure from the pressure regulator 318 is less than the pressure of the container as communicated by feedback line 330, the valve 320 is closed and gas conveyed to the container from the source by way of the higher-pressure manifold 314 is limited (e.g., blocked, reduced, etc.).

Referring now to FIG. 8, a circuit diagram of pneumatic system 410 includes a high-pressure supply 412, a pressure regulator 414 providing a low-pressure set point, a valve 418 used to control flow through the pneumatic system 410, and a receiver of the output 416 from the pneumatic system 410. A pilot pressure 420, corresponding to the low pressure set point, is provided to the valve 418 from the pressure regulator 414. The receiver of the output 416 also provides feedback 424 to the valve 418. In some embodiments, the feedback 424 is a pressure of gas in the receiver of the output 416. In other contemplated embodiments, the feedback 424 is another characteristic of or parameter associated with the gas in the receiver of the output 416, such as the present ratio of a mixture of gases, the present temperature of the gas, a sensed turbulence of the gas, etc.

According to an exemplary embodiment, the valve 418 is shown as a four-way directional control valve that has been configured to operate as a shutoff valve between the high-pressure supply 412 and the receiver of the output 416. According to an exemplary embodiment, the valve 418 includes a valve body 430, a valve gate 431, and an air bearing 432. In one embodiment, pressure regulator 414 provides pilot pressure 420 to a first end 421 of valve gate 431 and feedback 424 is provided to a second end 425 of valve gate 431. As shown in FIG. 8, the valve 418 includes a first port 433, a second port 434, a third port 435, and a fourth port 436. According to such an embodiment, the valve 418 opens the flow path between the high pressure supply 412 and the receiver of the output 416 as a function of the feedback 420 and the pilot pressure 424 from the regulator 414.

In some embodiments, when the pilot pressure 420 exceeds the pressure of gas in the receiver of the output 416, the valve 418 opens the flow path between first port 433 and second port 434 allowing gas to flow from the high-pressure supply 412 to the receiver of the output 416. When the pressure of the gas in the receiver of the output 416 exceeds the pilot pressure 420, the valve 418 closes the flow path. In some embodiments, the valve 418 may also provide access to an exhaust port 422 or vent, which may be used to relieve trapped pressure when the pneumatic system 410 is not actively supplying gas to the receiver of the output 416.

According to an exemplary embodiment, the pneumatic system 410 is an active system, allowing the system to respond to a dynamic environment. The high pressure supply 412 remains coupled to the valve 418 and the valve remains coupled to the receiver of the output 416. If pressure in the receiver of the output 416 drops below a desired pressure level or range, then the valve 418 opens to allow the high pressure supply 412 to be delivered thereto. If the pressure in the receiver of the output 416 rises above the desired pressure level or range, then the valve 418 opens the exhaust port 422, allowing gas to exit the receiver of the output 416. If pressure in the receiver of the output 416 reaches the desired pressure level or range, the valve 418 closes off the high pressure supply 412 and the exhaust port 422 from the receiver of the output 416.

The construction and arrangements of the pneumatic system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A pneumatic system, comprising:
   a first line configured to be coupled to a container, and to convey a flow of gas from a source to the container;
   a second line arranged co-axially with the first line and in communication with gas in the container, wherein the second line is narrower than the first line and extends within the first line;
   a valve coupled in series with the first line, between the source and the container, wherein the valve comprises:
     a valve body having a first port, a second port, and an exhaust port; and
     a valve gate operable within the valve body to selectively close the first port, the second port, and the exhaust port, place the first port in fluid communication with the second port, and place the container in fluid communication with the exhaust port;
     wherein the valve gate is in communication with the second line and is configured to control the flow of gas through the first line as a function of the pressure of the gas within the container; and
   a pressure regulator coupled to the source and to the valve, wherein the pressure regulator provides a pilot pressure to a first end of the valve gate, and wherein the second line provides a feedback to a second end of the valve gate.

2. The pneumatic system of claim 1, wherein the pilot pressure is less than 10 psi.

3. The pneumatic system of claim 2, wherein the pilot pressure is 2 psi or less.

4. The pneumatic system of claim 1, wherein the valve controls the flow of gas through the first line as a function of a pressure differential between the gas in the container and the pilot pressure.

5. The pneumatic system of claim 4, wherein the valve is a spool valve having a valve plug translatable upon an air bearing.

6. The pneumatic system of claim 1, wherein the second line projects from an end of the first line such that when the first line is coupled to the container, the second line extends into the volume of the container.

7. The pneumatic system of claim 1, wherein the second line is configured such that when the first line is coupled to the container the second line is simultaneously placed in communication with the gas in the container.

8. A pneumatic system, comprising:
   a first line configured to be coupled to a container, and to convey a flow of gas from a source to the container;
   a second line configured such that when the first line is coupled to the container, the second line is simultaneously placed in communication with gas in the container;
   a valve coupled in series with the first line, between the source and the container, wherein the valve comprises:
     a valve body having a first port, a second port, and an exhaust port;
     a valve gate operable within the valve body to selectively close the first port, the second port, and the exhaust port, place the first port in fluid communication with the second port, and place the container in fluid communication with the exhaust port;
     wherein the valve gate is in communication with the second line and is configured to control the flow of gas through the first line as a function of the pressure of the gas within the container; and a pressure regulator coupled to the source and to the valve, wherein the pressure regulator provides a pilot pressure to a first end of the valve gate, and wherein the second line provides a feedback to a second end of the valve gate.

9. The pneumatic system of claim 8, wherein the second line is arranged co-axially with the first line.

10. The pneumatic system of claim 9, wherein the second line is narrower than the first line and extends within the first line.

11. The pneumatic system of claim 10, wherein the second line projects from an end of the first line such that when the first line is coupled to the container, the second line extends into the volume of the container.

12. A pneumatic system, comprising:
   a first line configured to be coupled to a lower-pressure container, and to convey a flow of gas from a higher-pressure source to the lower-pressure container;
   a second line coupled to the first line and in communication with gas in the lower-pressure container, wherein the second line projects from an end of the first line such that when the first line is coupled to the lower-pressure container, the second line extends into the volume of the lower-pressure container;
   a valve coupled in series with the first line, between the higher-pressure source and the lower-pressure container, wherein the valve comprises:
      a valve body having a first port, a second port, and an exhaust port; and
      a valve gate operable within the valve body to selectively close the first port, the second port, and the exhaust port, place the first port in fluid communication with the second port, and place the lower-pressure container in fluid communication with the exhaust port;
      wherein the valve gate is in communication with the second line and is configured to control the flow of gas through the first line as a function of the pressure of the gas within the lower-pressure container; and
   a pressure regulator coupled to the higher-pressure source and to the valve, wherein the pressure regulator provides a pilot pressure to a first end of the valve gate, and wherein the second line provides a feedback to a second end of the valve gate.

13. The pneumatic system of claim 12, wherein the second line is arranged co-axially within the first line.

14. The pneumatic system of claim 13, wherein the second line is narrower than the first line and extends within the first line.

15. The pneumatic system of claim 14, wherein the second line is configured such that when the first line is coupled to the lower-pressure container the second line is simultaneously placed in communication with the gas in the lower-pressure container.

* * * * *